March 21, 1961
F. H. BERLIN, JR., ET AL
2,975,519
APPARATUS FOR AUTOMATICALLY DETERMINING
AND RECORDING DIMENSIONS OF OBJECTS
Filed July 25, 1958
4 Sheets-Sheet 1
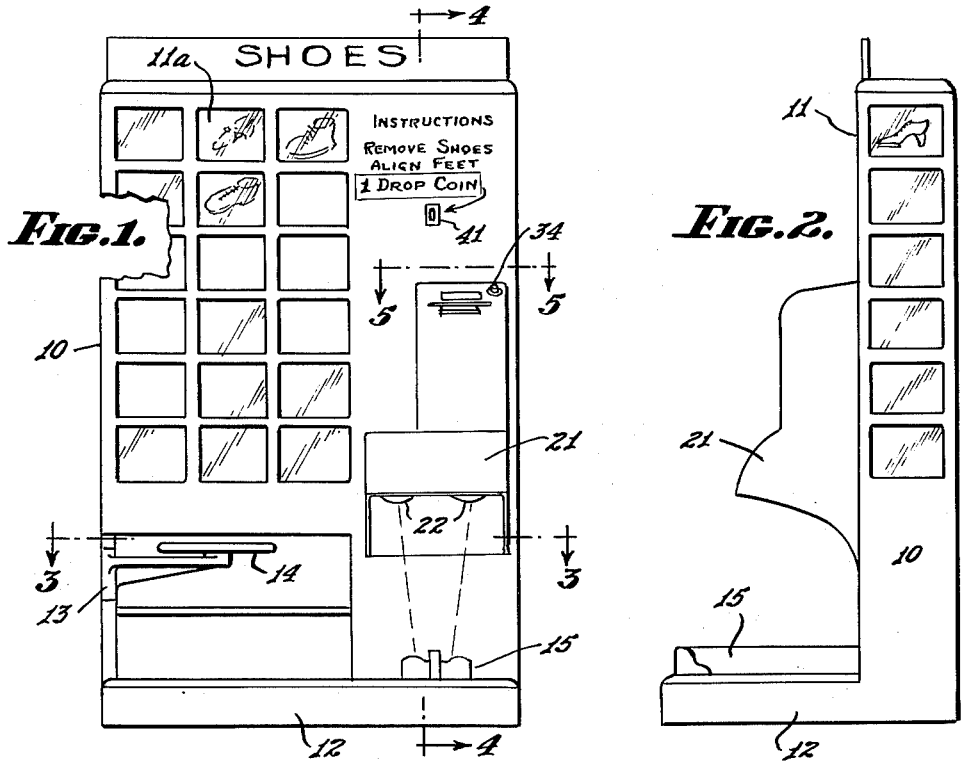
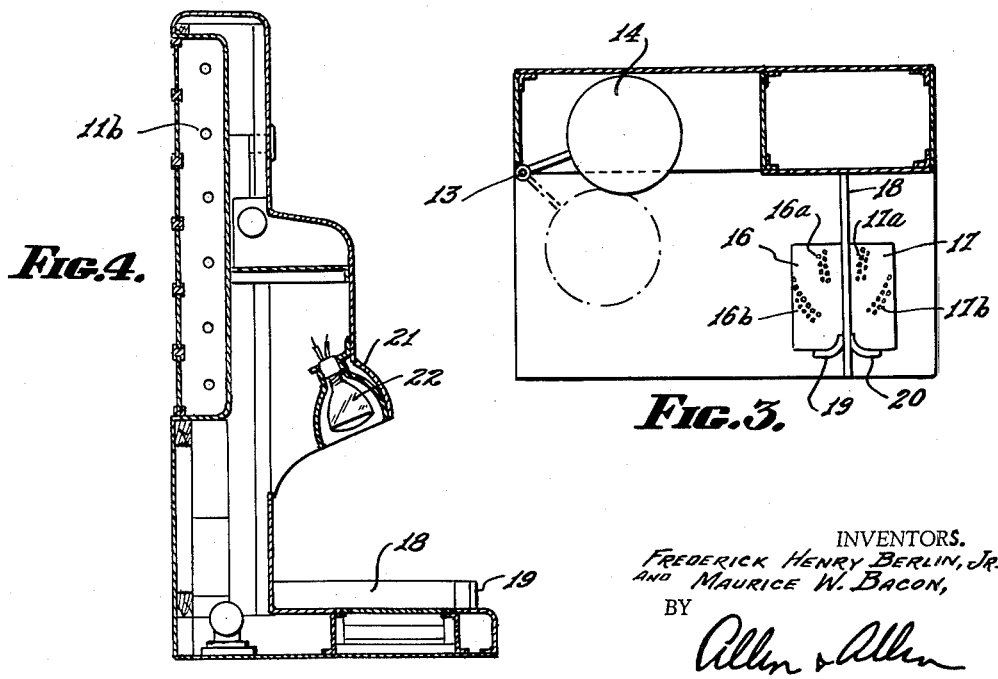
INVENTORS.
FREDERICK HENRY BERLIN, JR.,
AND MAURICE W. BACON,
BY
Allen & Allen
ATTORNEYS.

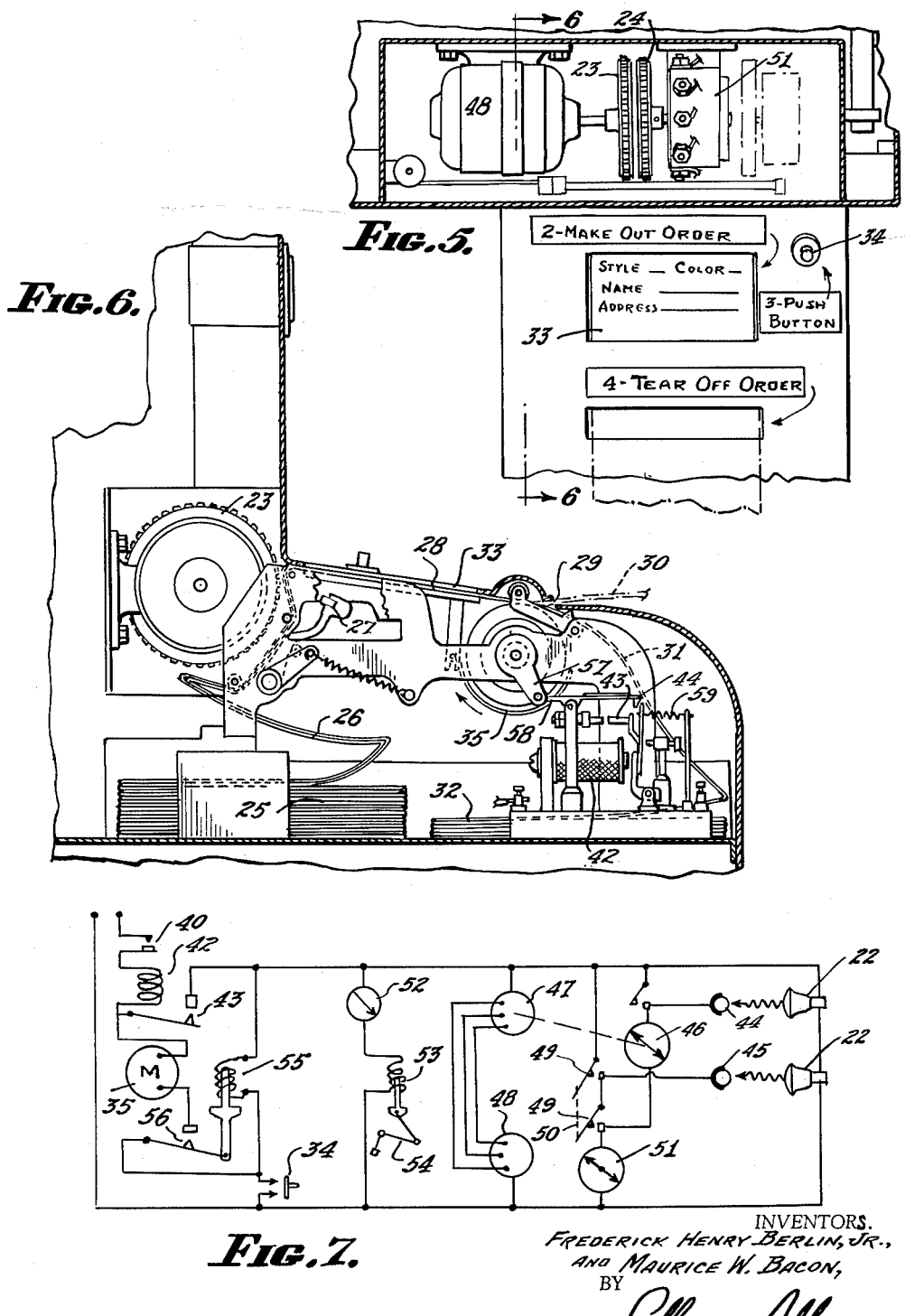

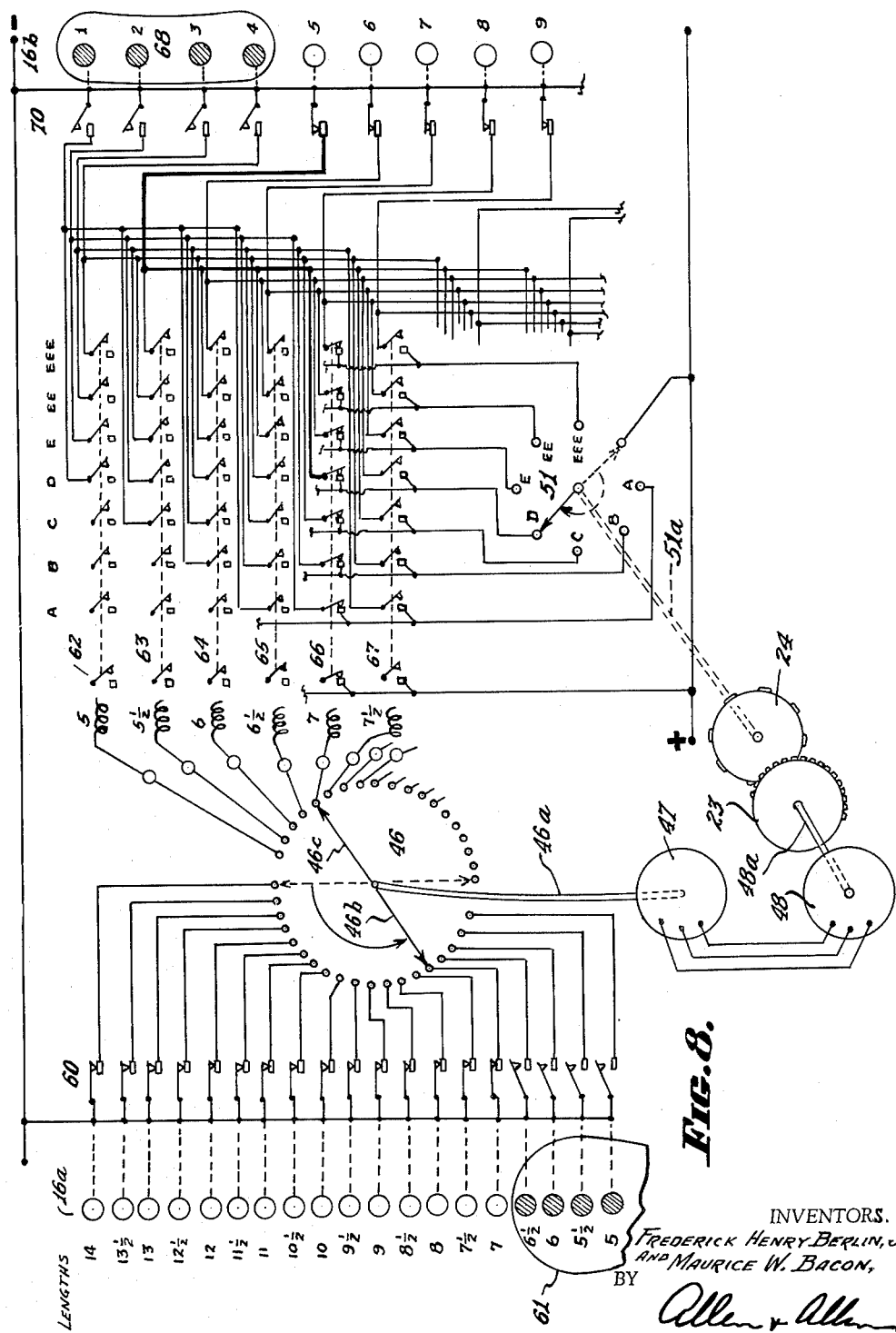

Fig. 9.

Length-Width Circuit Table

| Cell № | 5 | 5½ | 6 | 6½ | 7 | 7½ | 8 | 8½ | 9 | 9½ | 10 | 10½ | 11 | 11½ | 12 | 12½ | 13 | 13½ | 14 |
|---|---|---|---|---|---|---|---|---|---|---|---|---|---|---|---|---|---|---|---|
| 1 | D | C | B | A | | | | | | | | | | | | | | | |
| 2 | E | D | C | B | A | | | | | | | | | | | | | | |
| 3 | EE | E | D | C | B | A | | | | | | | | | | | | | |
| 4 | EEE | EE | E | D | C | B | A | | | | | | | | | | | | |
| 5 | | EEE | EE | E | D | C | B | A | | | | | | | | | | | |
| 6 | | | EEE | EE | E | D | C | B | A | | | | | | | | | | |
| 7 | | | | EEE | EE | E | D | C | B | A | | | | | | | | | |
| 8 | | | | | EEE | EE | E | D | C | B | A | | | | | | | | |
| 9 | | | | | | EEE | EE | E | D | C | B | A | | | | | | | |
| 10 | | | | | | | EEE | EE | E | D | C | B | A | | | | | | |
| 11 | | | | | | | | EEE | EE | E | D | C | B | A | | | | | |
| 12 | | | | | | | | | EEE | EE | E | D | C | B | A | | | | |
| 13 | | | | | | | | | | EEE | EE | E | D | C | B | A | | | |
| 14 | | | | | | | | | | | EEE | EE | E | D | C | B | A | | |
| 15 | | | | | | | | | | | | EEE | EE | E | D | C | B | A | |
| 16 | | | | | | | | | | | | | EEE | EE | E | D | C | B | A |
| 17 | | | | | | | | | | | | | | EEE | EE | E | D | C | B |
| 18 | | | | | | | | | | | | | | | EEE | EE | E | D | C |
| 19 | | | | | | | | | | | | | | | | EEE | EE | E | D |
| 20 | | | | | | | | | | | | | | | | | EEE | EE | E |

Length (rows 5 to 14, labeled across top)

United States Patent Office 2,975,519
Patented Mar. 21, 1961

2,975,519

APPARATUS FOR AUTOMATICALLY DETERMINING AND RECORDING DIMENSIONS OF OBJECTS

Frederick Henry Berlin, Jr., 164 E. 72nd St., New York, N.Y., and Maurice W. Bacon, Elmwood Road, R.D. 1, New Canaan, Conn., assignors of one-third to John W. Melville, Wyoming, Ohio Filed July 25, 1958, Ser. No. 750,966

12 Claims. (Cl. 33—3)

This invention relates to an apparatus for automatically determining and recording dimensions, such as length and width, of various objects. While an apparatus embodying the principles of the present invention may find application in various fields and for various purposes, it will have a particular utility in connection with the sale, for example, of shoes. Therefore, the concrete embodiment of the invention disclosed herein will be disclosed and described in the form of an apparatus for measuring foot sizes and recording them as an aid in the merchandising of shoes.

Shoes have always been merchandised in one of two ways. Either a shoe customer who knows his shoe size will order a pair of shoes from a catalogue and if the particular customer's idea of his shoe size is correct, he may get satisfaction from his purchase. Of course, if the customer does not know his shoe size he cannot order shoes from a catalogue.

The only other way in which shoes are merchandised is in a shoe store where a large stock of shoes in a large variety of styles and in a large variety of sizes is maintained. The store must employ a number of salesmen who inquire of the customer what his desires are and then pull out from the shelves several styles from which the customer may make his selection. The salesman then measures the customer's foot and selects the correct size in a style desired.

It is well understood that the overhead in such an establishment is a tremendous factor because of the enormous stock which must be kept at hand and because of the necessity of having salesmen who will be standing around and doing nothing during slack periods but who must be kept at hand and earn a salary in order to be available during shopping rush hours.

With the foregoing considerations in mind, it is an object of the present invention to provide an apparatus which is wholly automatic by means of which a customer may select a suitable style, determine the correct size and write out his own order in a minimum of time. It is a further object of the invention to provide an apparatus which will not require the presence of an attendant and which will carry simple instructions whereby a customer may serve himself.

The problem of determining the correct size of a shoe by measuring the length and width of the foot is a complex one. The length size is based simply upon the length of the foot and a given size of length represents a foot of a particular length. However, the width of the foot in absolute measurement does not correspond to a shoe width classification. Thus, a foot having a particular width in a shoe size 10 might have a width designated as A, but that same foot width in size 8½ shoe would represent a width D. There is, therefore, an interrelation between shoe widths and lengths which makes the measurement problem complex. It is therefore another object of the invention to provide an apparatus which will automatically determine the correct width based upon the given length of the foot.

These and other objects of the invention which will be described in more detail hereinafter or which will be apparent to one skilled in the art upon reading these specifications, are accomplished by that construction and arrangement of parts of which the following is an exemplary embodiment.

Reference is made to the drawings forming a part hereof and in which:

Figure 1 is a front elevational view of an apparatus according to the invention.

Figure 2 is an elevational view of the same as seen from the right of Figure 1.

Figure 3 is a cross-sectional view of the same, taken on the line 3—3 of Figure 1.

Figure 4 is a cross-sectional view of the same taken on line 4—4 of Figure 1.

Figure 5 is a fragmentary cross-sectional view on an enlarged scale taken on the line 5—5 of Figure 1.

Figure 6 is a cross-sectional view taken on the line 6—6 of Figure 5 on a still further enlarged scale.

Figure 7 is a simplified wiring diagram of the electrical system.

Figure 8 is a detailed wiring diagram of part of the system, and

Figure 9 is a table showing the relationship between the width cells and the length cells.

Briefly, in the practice of the invention we provide a cabinet having a floor and having on the floor a pair of foot positions. The foot positions are provided with heel abutments and inner metatarsal abutments whereby the feet may be properly located for measurement. A coin drop is provided and arranged, upon dropping of a suitable coin, to energize measuring circuits to measure the length and width of the feet and to transmit these measurements to a printing apparatus and to print the size data upon a duplicate order strip. The apparatus is then arranged so that the order blank is exposed so that the purchaser may fill in his name and address and indicate the style and color desired and finally upon pushing a button, one copy of the order is delivered to the customer and another copy is filed in the apparatus.

Referring now in greater detail to the drawings, the cabinet is indicated generally at 10 and comprises an upright portion 11 and a floor portion 12. Suitably pivoted, as at 13, is a stool 14. The stool may be swung from the position shown in solid lines in Figure 3, to that shown in broken lines, so that the customer may sit down on the stool 14 for the purpose of removing his shoes. It will be understood that the operation of swinging out the stool 14 may be arranged to energize one or more germicidal lamps to play upon the floor to prevent the transmission of athlete's foot and similar diseases of the foot. Such germicidal lamps and the circuits therefor are not shown but are well understood.

At 15 there is generally indicated a foot position. As best seen in Figure 3, there are provided a foot plate 16 for the left foot and a plate 17 for the right foot. A divider 18 provides an inner abutment for the metatarsal portions of the feet and heel abutments 19 and 20 are also provided. Thus, a customer having removed his shoes may stand with his left foot upon the plate 16 and his right foot upon the plate 17 with the heels against the heel plates 19 and 20 and with the metatarsal portions abutting the divider 18.

The cabinet has a hood portion 21 under which are disposed a pair of lamps 22, one of which is arranged to play upon the foot plate 16 and the other on the foot plate 17. The foot plates are provided with two series of holes each. Thus, the plate 16 is provided with the series of holes indicated generally at 16a, which are arranged to measure the length of the left foot in half sizes. The plate 17 has the corresponding series of holes 17a which measure the length of the right foot in terms of half sizes. The plate 16 further has a series of holes 16b which measure the width of the left foot and the plate 17 has the series of holes 17b which measure the width of the right foot. In Figure 3 each of the series of holes is shown as being in two rows close together and this is simply a matter of convenience because if it were attempted to place all the holes in a single row, they would come so close together as to be impracticable from a manufacturing standpoint. The holes are therefore preferably placed in two rows and are staggered.

Without at this point going into the details of the circuit involved, it should be understood that there is a light sensitive cell such as a photovoltaic cell associated with each of the holes and it will be understood that when a customer is standing with his feet properly positioned on the plates 16 and 17, some of the holes in each of the series of holes 16a, 16b, 17a and 17b will be covered and others will be exposed. By means which will be described in more detail hereinafter, the type wheels 23 and 24 (Fig. 5 and 6) are rotated into position for the printing of the customer's shoe size. The orientation of the type wheels and the printing of the size on the order strip and the opening of the order blank shutter take place automatically. In Figure 6 a supply of duplicate order blanks is indicated at 25 and the duplicate strip 26 from the supply 25 is lead past the type wheels 23 and 24 in position to be printed by the action of the hammer 27 and then passes over a writing support 28 to the point 29 at which one copy, indicated in broken lines at 30, is fed out of the apparatus and the other copy, indicated in broken lines at 31, is fed to a storage position with the apparatus where the stored completed orders are indicated at 32.

The details of the printing and feeding mechanism will not be described because they do not constitute a part of the present invention and are in all respects conventional.

When the shutter has been withdrawn from the window 33, the customer can write on the order blank his name and address and the style and color of the shoes desired. He will then press the button 34 which will cause the paper feed motor 35 to make one revolution and then shut the apparatus off.

As a matter of convenience, the upright portion 11 of the cabinet may be provided with display windows 11a in which transparencies may be located, showing various shoe styles and these may be illuminated from the rear by light sources 11b.

In the circuit description which follows, a single foot measurement has been described. In will be understood that the circuitry and printing mechanism may be duplicated to measure and print the sizes of both feet, or by a simple switching arrangement, a measurement of either foot, at the option of the customer, may be made.

Having now rather generally described the apparatus and its operation, reference will be had to Figures 7, 8 and 9 for a more detailed explanation of the apparatus. In Figure 7 there is shown a simplified diagram which will now be described. The coin operated switch is indicated at 40 and it is closed by the action of a coin inserted in the slot 41 (Fig. 1). The closing of the coin switch 40 energizes the relay 42 closing the switch 43. The switch 43 is held in closed position by a latch 44 (Fig. 6) so that it takes only a momentary actuation of the switch 40 to close the switch 43 and hold it closed.

The closing of the switch 43 energizes the lamp or lamps 22 which play upon the foot plates and the customer's feet. 44 (Fig. 7) represents the first photovoltaic cell which is not obscured by the customer's foot in the length series 16a or 17a. 45 similarly indicates the first photovoltaic cell in the series 16b or 17b which is not obscured by the customer's foot. The cells 44 and 45 are therefore energized when light from the sources 22 impinges upon them. Energization of the cell 44 actuates a stepping relay 46. Since the stepping relay is a well known piece of equipment, it will not be described herein. The stepping relay of course rotates until it reaches the point where the customer's foot obscures the next photovoltaic cell and prevents the relay 46 from rotating further. The shaft of the relay 46 is connected directly to the shaft of a selsyn generator 47 which is electrically connected to a selsyn motor 48 (see also Fig. 5), the shaft of which carries the length type wheel 23.

The switches 49 are part of a gang switch 50 which is actuated by the stepping relay 46 so that when the cell 45 is energized, current is applied to a second stepping relay 51 (see also Fig. 5) which carries on its shaft the type wheel 24 having the width indications.

52 is a time delay device to postpone energization of the relay 53 until the type wheels have been properly oriented whereupon energization of the relay 53 actuates the mechanism generally indicated at 54 which produces printing action of the hammer 27 and opening of the writing aperture 33.

When the customer has completed his order, he presses the button 34 which energizes the relay 55 to close the switch 56 starting the paper feed motor 35. This motor, as is conventional in apparatus of this type, is arranged to make a single revolution during which, as is well known, it feeds the paper blank to bring a new order blank into position, to feed the customer's order out of the apparatus to a position where it may be torn off, and at the completion of its revolution, the arm 57 (Fig. 6) strikes the heel of the latch lever 58 to release the latch 44, permitting the switch 43 to open under the influence of the spring 59. This shuts the apparatus off and the operation is complete.

Referring now to Figure 8, the wiring diagram is shown in detail for certain of the size relationships. At the left side of the figure there are shown the photovoltaic cells of the series 16a or 17a and opposite each of the cells there is indication of the size in length to which that cell corresponds. Each of the cells 16a is arranged to close one of the switches in the row 60. A customer's foot is indicated at 61 and it will be seen that the cells corresponding to sizes 5 to 6½ are obscured by the foot but the cell corresponding to 7 and all remaining cells will be energized. Thus, it will be seen that in the row of switches 60 the switches for all sizes from 7½ on up are closed. As a result of this the stepping relay 46 will rotate to the position shown. The shaft 46a of the stepping relay is connected to the selsyn generator 47 as described above, which transmits its motion to the selsyn motor 48, the shaft 48a of which carries the length type wheel 23.

When the arm 46b of the stepping relay 46 rotates, its arm 46c also establishes a contact to an appropriate one of a series of gang switches. These gang switches are indicated generally at 62, 63, 64, 65, 66, 67 and in the position shown, the arm 46c has energized the gang switch 66 corresponding to a size 7 shoe in length.

While the switches 62–67 have been shown and designated as gang switches to simplify the drawing, it will be understood that the same result may be accomplished by means of a master relay for each length, which when closed, energizes the circuits to the respective width relays. The width relays may then be energized individually by their respective light cells.

At the right hand side of the figure are shown some of the photovoltaic series in the series 16b and a portion of a foot is indicated at 68. The portion of the foot indicated obscures cells numbered 1, 2, 3 and 4, while all cells beyond number 5 will be energized. Associated with each of the cells of the series 16b is a switch 70 similar to the switches 60 and in the particular position shown, it will be observed that the switches 70 associated with the cells 5 and above are all closed while those associated with cells 1 to 4 are open. It will further be observed that cell 5 is connected into the gang switches 63, 64, 65, 66, 67, etc., so that a circuit is established to that gang switch of the 62–67 series which is closed.

At 62a, 63a, 64a, 65a, 66a, 67a, etc., are shown inertial elements (impedances for example) which impart a time delay and prevent operation of those of the gang switches passed over by the arm 46c. Therefore it will not be until the arm 46c comes to rest that the appropriate gang switch is actuated. This, of course, in the case illustrated is the gang switch 66 and by tracing the circuit, it will be observed that a circuit is established to size D in width. This causes the second stepping relay 51 to rotate to the D position shown and since the width type wheel 24 is mounted on the shaft 51a of the stepping relay 51, it positions the type wheel 24 to print the appropriate width D.

The relationship between the gang switches 62–67, etc., and the width cells 16b is clearly shown in the diagram of Figure 9. Accross the top of the figure are shown the length sizes from 5 in half steps through 14. These correspond to the nineteen cells 16a. The width cells are in the vertical column at the left-hand side of the figure and it will be seen that there are twenty cells numbered 1 to 20. In the particular situation illustrated in Figure 8, the length cells indicated a size of 7 and the width cell 5 set the gang switch in a position such that width D was indicated. If, for example, with the gang switch in the position shown in Figure 8 width cell 7 had been the first one energized, width EE would have been indicated. Similarly, if width cell 5 were the one which was energized but the length cells had indicated a size of 6, then the gang switch 64 would have been closed and the width indication would have been EE.

From the foregoing circuit description, it will be understood that the circuit is arranged to give a true relative width reading based upon length regardless of the absolute width of the customer's foot. It will also be understood that the circuit diagram of Figure 8 is only a partial one but it is believed that sufficient of the circuit has been shown to explain the principle of operation and that one skilled in the art will readily be able to carry on the circuit for the rest of the size-width relationships on the basis of the table of Figure 9.

It will be understood that the use of photovoltaic cells illuminated by a light source is given by way of example only and that other sensing means may be employed if desired. Likewise, the apparatus of the invention may employ vacuum tubes to accomplish the necessary circuit selection within the scope of certain of the claims. It will also be understood that details of the paper feed and printing mechanism may be varied at will and do not constitute a part of the invention. It will also be clear that additional refinements may be added without departing from the spirit of the invention, as by incorporating a weighing scale in the foot position and causing the customer's weight to be put on the order. All of these things can be done by conventional means. Likewise, push-buttons operating electric switches could be provided in association with each style represented in the windows 11a so that a code symbol for the style could be printed directly on the order.

It will also be understood that details of the operation subsequent to the completion of the order may involve C.O.D. shipment of the shoes to the customer or the customer may call at a specified location to receive the shoes which will have been packaged for him.

Numerous modifications may be made without departing from the spirit of the invention and no limitation should be assumed other than those specifically set forth in the claims which follow.

What is claimed is:

1. In a device for measuring and indicating the length and width of an object, wherein the length is expressed in absolute terms and the width is expressed in one of a series of arbitrary terms, there being a different series for each length term; a first series of sensing means of which a number are adapted to be actuated in accordance with the length of said object being measured, a first stepping relay having a series of contacts connected respectively to the sensing means of said first series, and thereby being rotated an in accordance with the number of sensing means of said first series which are actuated, a length indicator, and means for transmitting the rotation of said stepping relay to said length indicator, said stepping relay having a contact arm also arranged to be rotated an amount in accordance with the number of sensing means of said first series which are actuated, a number of contacts positioned to be contacted by said contact arm, a gang switch associated with each of said contacts whereby the number of sensing means of said first series which are actuated determines which of said gang switches are actuated, a second series of sensing means of which a number are adapted to be actuated in accordance with the width of said object being measured, a second stepping relay having a series of contacts equal in number to a limited number of arbitrary width measurements, a connection from each of the sensing means of said second series to each of the contacts on said second stepping relay through said gang switches, whereby the number of sensing means of said first series which are actuated determines which contact of said second stepping relay is energized by the particular number of sensing means of said second series which are actuated, a width indicator calibrated in said limited number of arbitrary width measurements, and means for transmitting the rotation of said second stepping relay to said width indicator.

2. In a device for measuring and indicating one dimension of an object in absolute terms, and another dimension of said object in one of a series of aribitrary terms, there being a different series for each term of said one dimension; a first series of sensing means of which a number are adapted to be actuated in accordance with the said one dimension of said object being measured, a first stepping relay having a series of contacts connected respectively to the sensing means of said first series, and thereby being rotated an amount in accordance with the number of sensing means of said first series which are actuated, an indicator for said one dimension, and means for transmitting the rotation of said stepping relay to the said indicator, said stepping relay having a contact arm also arranged to be rotated an amount in accordance with the number of sensing means of said first series which are actuated, a number of contacts positioned to be contacted by said contact arm, a gang switch associated with each of said contacts whereby the number of sensing means of said first series which are actuated determines which of said gang switches are actuated, a second series of sensing means of which a number are adapted to be actuated in accordance with the said other dimension of said objects being measured, a second stepping relay having a series of contacts equal in number to a limited number of arbitrary other dimension measurements, a connection from each of the sensing means of said second series to each of the contacts on said second stepping relay through said gang switches, whereby the number of sensing means of said first series which are actuated determine which contact of said second stepping relay is energized by the particular number of sensing means of said second series which are actuated, an indicator for said other dimension calibrated in said limited number of arbitrary other dimension measurements, and means for transmitting the rotation of said second stepping relay to said other dimension indicator.

3. Apparatus for measuring the length and width of a human foot, comprising a cabinet having a floor, a foot position on said floor including a heel abutment and an inner metatarsal abutment, a first series of holes in said floor, located in the region of the big toe of a foot placed on said foot position and properly located with respect to said abutments, said holes being disposed at varying distances from said heel abutment to indicate half sizes in shoe length, a second series of holes in said floor, located in the region of the outer metatarsal of a foot placed on said foot position and properly located with respect to said abutments, said holes being disposed at varying distances from said metatarsal abutment to indicate sizes in shoe width, a light sensitive element under said floor associated with each of said holes, a source of light arranged to play on said floor in the region of said holes, whereby when a foot is placed on said foot position and properly located with respect to said abutments, the light sensitive elements associated with those of said holes which are not covered by said foot are energized, and means responsive to the energization of said light sensitive elements to indicate the length and width of said foot.

4. Apparatus according to claim 3, including also a printing mechanism, a supply of duplicate paper strip, length and width type wheels, means for causing said type wheels to print on said strip, means to orient said type wheels in response to the energization of said light sensitive elements, and means to advance said strip for succeeding measuring operations.

5. Apparatus according to claim 3, wherein there is provided a first stepping relay having a series of contacts connected respectively to the light sensitive elements in the region of the big toe, said stepping relay thereby being rotated an amount in accordance with the number of said light sensitive elements which are actuated, a length indicator and means for transmitting the rotation of said stepping relay to said length indicator, said stepping relay having a contact arm also arranged to be rotated an amount in accordance with the number of said light sensitive elements which are actuated, a number of contacts positioned to be contacted by said contact arm, a gang switch associated with each of said contacts whereby the number of said first mentioned light sensitive elements which are actuated determines which of said gang switches are actuated, a second stepping relay having a series of contacts equal in number to a limited number of relative width measurements, a connection from each of the light sensitive elements in the metatarsal region to each of the contacts on said second stepping relay through said gang switches, whereby the number of said big toe light sensitive elements which are actuated determines which contact of said second stepping relay is energized by the particular number of said metatarsal sensing means which are actuated, a width indicator calibrated in said limited number of width measurements, and means for transmitting the rotation of said second stepping relay to said width indicator.

6. Apparatus according to claim 5, wherein there is provided a printing mechanism including a supply of duplicate paper strip, length and width type wheels, means for causing said type wheels to print on said strip, means to orient said type wheels in response to the rotation of said stepping relays, and means to advance said strip for succeeding measuring operations.

7. In a device for measuring and indicating one dimension of an object in absolute terms, and another dimension of said object in one of a series of arbitrary terms, there being a different series for each term of said one dimension; first sensing means adapted to sense said one dimension of said object, electronic means responsive to the sensings of said first sensing means to indicate the said one dimension in said absolute terms; second sensing means adapted to sense the other dimension of said object; electronic modifying means actuated in response to the sensings of said first sensing means, and operative to modify the sensings of said second sensing means; and electronic indicating means for said other dimension actuated in response to said modified sensings to indicate the said other dimension in one of said series of arbitrary terms.

8. In a device for measuring and indicating the length and width of an object, wherein the length is expressed in absolute terms, and the width is expressed in one of a series of arbitrary terms, there being a different series for each length term; first sensing means adapted to sense the length of said object, electronic means responsive to the sensings of said first sensing means to indicate the said length in said absolute terms; second sensing means adapted to sense the width of said object; electronic modifying means actuated in response to the sensings of said length sensing means, and operative to modify the sensings of said width sensing means; and electronic width indicating means actuated in response to said modified sensings to indicate the width in one of said series of arbitrary terms.

9. In a device for measuring and indicating the length and width of an object, wherein the length is expressed in absolute terms, and the width is expressed in one of a series of arbitrary terms, there being a different series for each length term; a first series of sensing means of which a portion is adapted to be actuated in accordance with the length of said object, means responsive to the number of said first series of sensing means which are actuated, to indicate the said length in said absolute terms; a second series of sensing means of which a portion is adapted to be actuated in accordance with the width of said object; modifying means actuated in response to the number of said first series of sensing means which are actuated, and operative to modify the sensings of said actuated number of width sensing means; and width indicating means actuated in response to said modified sensings to indicate the width in one of said series of arbitrary terms.

10. In a device for measuring and indicating the length and width of an object, wherein the length is expressed in absolute terms, and the width is expressed in one of a series of arbitrary terms, there being a different series for each length term; first sensing means adapted to sense the length of said object, means responsive to the sensings of said length sensing means to indicate the said length in said absolute terms; second sensing means adapted to sense the width of said object; a plurality of electric circuits connected to said second sensing means; a number of switching means for selecting particular ones of said electric circuits, an operative connection between said length indicating means and said switching means, whereby the length indication of said length indicating means actuates the switching means to select particular ones of said electric circuits, a rotatable indicating device for indicating the width of said object, said width indicating device being connected to said electric circuit as selected by said switching means, to cause said rotatable indicating device to give a width indication in one of said series of arbitrary terms.

11. In a device for measuring and indicating the length and width of an object, wherein the length is expressed in absolute terms, and the width is expressed in one of a series of arbitrary terms, there being a different series for each length term; a first series of sensing means of which a portion is adapted to be actuated in accordance with the length of said object, means responsive to the number of said first series of sensing means which are actuated, to indicate the said length in said absolute terms; a second series of sensing means of which a portion is adapted to be actuated in accordance with the width of said object; a plurality of electric circuits connected to each of the sensing means of said second series of sensing means, a number of switching means for selecting particular ones of said electric circuits, an operative connection between said length indicating means and said switching means, whereby the length indication of said length indicating means actuates the switching means to select particular ones of said electric circuits, a rotatable indicating device for indicating the width of said object, said width indicating device being connected to said electric circuits as selected by said switching means, to cause said rotatable indicating device to give a width indication in one of said series of arbitrary terms.

12. Apparatus for measuring the length and width of a human foot, wherein the length is expressed in absolute terms, and the width is expressed in one of a series of arbitrary terms, there being a different series for each length term; comprising a cabinet having a floor, a foot position on said floor including a heel abutment and an inner metatarsal abutment, a first series of sensing means located in the region of the big toe of a foot placed on said foot position and properly located with respect to said abutments, the sensing means of said first series being disposed at varying distances from said heel abutments to sense half sizes in shoe length, means responsive to the sensings of said length sensing means to indicate said length; a second series of sensing means located in the region of the outer metatarsal of the foot placed on said foot position and properly located with respect to said abutments, the sensing means of said second series being disposed at varying distances from said metatarsal abutment to sense sizes in shoe width; modifying means actuated in response to the sensings of said length sensing means, and operative to modify the sensings of said width sensing means; and width indicating means actuated in response to the said modified sensings to indicate the width in one of said series of arbitrary terms.

References Cited in the file of this patent

UNITED STATES PATENTS

| | | |
|---|---|---|
| 2,331,177 | Del Pesco | Oct. 5, 1943 |
| 2,531,477 | Smith | Nov. 28, 1950 |
| 2,688,188 | Booth | Sept. 7, 1954 |
| 2,708,368 | Kolisch | May 17, 1955 |

UNITED STATES PATENT OFFICE
CERTIFICATION OF CORRECTION

Patent No. 2,975,519            March 21, 1961

Frederick Henry Berlin, Jr., et al.

It is hereby certified that error appears in the above numbered patent requiring correction and that the said Letters Patent should read as corrected below.

Column 6, line 5, after "an" insert -- amount --; line 24, for "sensin" read -- sensing --; line 55, for "objects" read -- object --.

Signed and sealed this 8th day of August 1961.

(SEAL)
Attest:

ERNEST W. SWIDER
Attesting Officer

DAVID L. LADD
Commissioner of Patents